US007003401B2

(12) United States Patent
Haugland

(10) Patent No.: US 7,003,401 B2
(45) Date of Patent: Feb. 21, 2006

(54) ADJUSTMENT FOR FREQUENCY DISPERSION EFFECTS IN ELECTROMAGNETIC LOGGING DATA

(75) Inventor: S. Mark Haugland, Houston, TX (US)

(73) Assignee: PathFinder Energy Services, Inc., Houston, TX (US)

( * ) Notice: Subject to any disclaimer, the term of this patent is extended or adjusted under 35 U.S.C. 154(b) by 10 days.

(21) Appl. No.: 11/080,169

(22) Filed: Mar. 15, 2005

(65) Prior Publication Data

US 2005/0159895 A1   Jul. 21, 2005

Related U.S. Application Data

(62) Division of application No. 10/655,290, filed on Sep. 4, 2003, now Pat. No. 6,892,137.

(60) Provisional application No. 60/466,533, filed on Apr. 29, 2003.

(51) Int. Cl.
*G01V 3/18*   (2006.01)
*G01V 1/00*   (2006.01)

(52) U.S. Cl. ............................................. 702/7; 367/32
(58) Field of Classification Search .................... 702/7, 702/11; 367/32, 49; 703/10; 324/348, 364
See application file for complete search history.

(56) References Cited

U.S. PATENT DOCUMENTS

| 3,944,910 A | 3/1976 | Rau |
| 4,185,238 A | 1/1980 | Huchital et al. |
| 4,209,247 A | 6/1980 | Urano et al. |
| 4,209,747 A | 6/1980 | Huchital |
| 4,652,828 A | 3/1987 | Kenyon et al. |
| 4,780,679 A | 10/1988 | Kenyon et al. |
| 4,899,112 A | 2/1990 | Clark et al. |
| 4,968,940 A | 11/1990 | Clark et al. |
| 5,144,245 A | 9/1992 | Wisler |
| 5,157,605 A | 10/1992 | Chandler et al. |
| 5,345,179 A | 9/1994 | Habashy et al. |

(Continued)

FOREIGN PATENT DOCUMENTS

EP   0793119 A3   9/1997

(Continued)

OTHER PUBLICATIONS

Dielectric-Independent 2-MHz Propagation Resistivities, Peter T. Wu, John R. Lovell, Brian Clark, Stephen D. Bonner and Jacques R. Tabanou, Society of Petroleum Engineers, Inc. SPE 56448, 19 pages (1999).

(Continued)

*Primary Examiner*—Bryan Bui
*Assistant Examiner*—Toan M. Le

(57) ABSTRACT

Method and apparatus are provided for adjusting electromagnetic well logging data for effects of frequency dispersion. In exemplary embodiments, a model is provided for estimating an electrical property of an earth formation as a function of frequency. The model is derived, for each particular volume of interest, based on measured data obtained by employing a plurality of interrogation frequencies. Measured data may include electrical properties of the volume of interest such as conductivity and dielectric constant. The model predicts the measurements expected to be obtained by a tool employing a selected interrogation frequency, including frequencies for which no measured data are available. In one embodiment, the model may be used to adjust measured data for effects of frequency dispersion to correspond to a selected interrogation frequency, allowing the adjusted data to be more effectively correlated to logging data obtained by a different type of tool employing a different interrogation frequency.

12 Claims, 3 Drawing Sheets

U.S. PATENT DOCUMENTS

| | | | |
|---|---|---|---|
| 5,574,374 | A | 11/1996 | Thompson et al. |
| 5,585,727 | A * | 12/1996 | Fanini et al. ............... 324/339 |
| 5,594,343 | A | 1/1997 | Clark et al. |
| 5,867,806 | A | 2/1999 | Strickland et al. |
| 5,869,968 | A | 2/1999 | Brooks et al. |
| 5,881,973 | A | 3/1999 | Agajanian et al. |
| 5,884,227 | A | 3/1999 | Rabinovich et al. |
| 5,892,361 | A | 4/1999 | Meyer, Jr. et al. |
| 5,963,036 | A | 10/1999 | Wu et al. |
| 5,966,013 | A | 10/1999 | Hagiwara |
| 6,060,884 | A | 5/2000 | Meyer, Jr. et al. |
| 6,092,024 | A | 7/2000 | Wu |
| 6,115,670 | A | 9/2000 | Druskin et al. |
| 6,211,678 | B1 | 4/2001 | Hagiwara |
| 6,216,090 | B1 | 4/2001 | Hagiwara |
| 6,218,841 | B1 | 4/2001 | Wu |
| 6,219,619 | B1 | 4/2001 | Xiao et al. |
| 6,366,858 | B1 | 4/2002 | Haugland |
| 6,385,545 | B1 | 5/2002 | Wu |
| 6,393,363 | B1 * | 5/2002 | Wilt et al. ...................... 702/6 |
| 6,574,562 | B1 * | 6/2003 | Tabarovsky et al. ........... 702/7 |
| 6,591,195 | B1 * | 7/2003 | Haugland ....................... 702/7 |
| 6,631,328 | B1 | 10/2003 | Haugland |
| 6,670,813 | B1 * | 12/2003 | Strack ......................... 324/323 |
| 6,760,666 | B1 * | 7/2004 | Hagiwara ....................... 702/7 |
| 6,791,330 | B1 * | 9/2004 | McCormick ................ 324/338 |
| 2003/0163258 | A1 | 8/2003 | Haugland |

FOREIGN PATENT DOCUMENTS

| | | |
|---|---|---|
| EP | 0840142 A3 | 5/1998 |
| GB | 2322220 A | 8/1998 |

OTHER PUBLICATIONS

New Developments in 2- MHz Electromagnetic Wave Resistivity Measurements, S. Gianzero, G. A. Merchant, M. Haugland and R. Strickland, SPWLA 35th Annual Logging Symposium, pp. 1-25 (Jun. 19-22, 1994).

Vertical Deconvolution of 2 MHz Propagation Tools, Richard Rosthal, David Allen and Stephen Bonner, SPWLA 34th Annual Logging Symposium (Jun. 13-16, 1993).

Geometric Factor and Adaptive Deconvolution of MWD-PWR Tools, Q. Zhou, D. J. Hilllker and D. Norwood, The Log Analyst, pp. 390-398 (Jul.-Aug., 1992).

Reconciling Differences in Depth of Investigation Between 2- MHz Phase Shift and Attenuation Resistivity Measurements, Tarek Habashy and Barbara Anderson, SPWLA 32nd Annual Logging Symposium, pp. 1-20 (Jun. 16-19, 1991).

Complex Variables and Applications 5th Ed., Ruel V. Churchill and James Ware Brown, 2 cover pages and pp. 48-50 (1990).

Waves and Fields In Inhomogeneous Media, Transients, Weng Cho Chew, 2 cover pages, pp. 244-246, 360-365 and 485-487 (1990).

Algorithm 624: Triangulation and Interpolation at Arbitrarily Distributed Points In the Plane, Robert J. Renka, ACM. Transaction on Mathematical Software, vol. 10, pp. 440-442 (Dec. 4, 1984).

A Triangle-Based $C^1$ Interpolation Method, R. J. Renka and A. K. Cline, rocky Mountain Journal Mathematics, vol. 14, No. 1, pp. 223-237 (Winter 1984).

Geophysics, A Journal of General and Applied Geophysics, Published by The Society of Exploration Geophysicists, vol. XXVII, No. 6, Part 1, cover page and pp. 828-858 (Dec. 1962).

Effect of Tool Eccentricity on Some Electrical Well-Logging Tools, John R. Lovell and Weng Cho Chew, IEEE Transactions on Geoscience and Remote Sensing, vol. 28, No. 1, pp. 127-136 (Jan. 1990).

Fundamental Analysis of Remote-Field Eddy-Current Effect, IEEE Transactions on Magnetics, vol. 32, No. 4, pp. 3195-3211 (Jul. 1996).

Numerical Recipes, The Art of Scientific Computing, © Cambridge Press 1986 and © Numerical Recipes Software, 2 cover pages, pp. 52-65 and 520-527 (1986).

NAG Fortran Library Manual Mark 18, © The Numerical Algorithms Group Limited, vol. 4, D04-4E04L cover pages and pp. E04.1-E04.16 and 1-6 (Sep. 1997).

New Discovery with Important Implications of LWD Propagation Resistivity Processing and Interpretation, S. Mark Haugland, SPWLA 42nd Annual Logging Symposium, pp. 1-14 (Jun. 17-20, 2001).

Handbook of Electromagnetic Materials, Monolithic and Composite Versions and Their Applications, Perambur S. Neelakanta, PhD., C.Eng., © 1995 by CRC Press, Inc., cover pages and p. 46.

Estimation Of Water Content and Poorosity Using Combined Radar and Geoelectrical Measurements, Grit Dannowski and Ugur Yaramanci, Technical University of Berlin, Dept. of Applied Geophysics, Jul. 28, 1999.

Comparisions of Wireline and LWD Resistivity Highlight Resistivity Frequency Dispersion In Sedimentary Formations, Roland Chemali, Dale Heysee, G. A. Merchang, Charles Jackson, SPWLA 36th Annual Logging Symposium, pp. 1-12 (Jun. 26-29, 1995).

In-situ Measurement of Resistivity Dispersions (or lack of it) Using MWD Propagation Resistivity Tools, W. Hal Meyer, SPWLA 40th Annual Logging Symposium, pp. 1-14, (May 30-Jun. 3, 1999).

* cited by examiner

ADJUSTMENT FOR FREQUENCY DISPERSION EFFECTS IN ELECTROMAGNETIC LOGGING DATA

RELATED APPLICATIONS

This application is a division of application Ser. No. 10/655,290, filed Sep. 4, 2003 now U.S. Pat. No. 6,892,137, which claims the benefit of U.S. Provisional Application No. 60/466,533, filed Apr. 29, 2003.

FIELD OF THE INVENTION

This invention, in exemplary embodiments, relates to the field of oil well logging, and in particular, to methods and apparatus for calculating and adjusting for the effects of frequency dispersion on measurements of electrical properties such as resistivity or dielectric constant in earth formations.

BACKGROUND OF THE INVENTION

In oil and gas exploration, electrical properties of the earth formations are commonly measured to provide useful clues about the materials composing the formations, such as the presence or absence of oil-bearing structures near a borehole. Techniques for measuring electrical properties of earth formations include lowering an instrument into the borehole to obtain the measurements. The instrument may be positioned in the borehole after the drill bit is removed, which is often referred to as "wireline logging." Alternatively, an instrument is included in the drill string to acquire measurements while the borehole is being drilled, which is often referred to as "measurement-while-drilling" (MWD) or "logging-while-drilling" (LWD).

Instruments utilized by MWD/LWD techniques include "wave resistivity tools" that transmit an electromagnetic wave with at least one interrogation frequency into the surrounding formation. The attenuation and/or phase shift of the wave is measured by two spaced receivers to estimate an electrical property such as the resistivity and/or dielectric constant of the formation. The interrogation frequencies of wave resistivity tools are commonly selected from the range 400 kHz to 2 MHz, although other interrogation frequencies may be utilized.

Wireline logging techniques commonly employ "inductive resistivity tools" or, alternatively, "galvanic resistivity tools." Inductive resistivity tools generate an AC magnetic field with a selected interrogation frequency in the surrounding formation to induce an alternating current through the formation. A receiver system measures the perturbations to the AC field caused by the alternating current to derive an estimate of the resistivity of the surrounding formation. Galvanic resistivity tools inject current having a selected interrogation frequency directly into a formation to measure the resistivity. Interrogation frequencies employed by inductive and galvanic resistivity tools are commonly selected from the range 100 Hz to 100 kHz. Typical interrogation frequencies employed by inductive and galvanic tools are usually not sufficiently high to determine dielectric properties of the earth formation.

Resistivity measurements obtained by MWD/LWD techniques sometimes do not agree with measurements obtained by wireline logging techniques. Discrepancies are sometimes attributable to the deteriorating conditions of the borehole and surrounding environment affecting wireline logging techniques, which are typically performed long after the borehole has been drilled. However, frequency dispersion can be another factor that can adversely affect the correlation of resistivity measurements obtained by MWD/LWD and wireline logging, given that the two types of techniques typically employ different interrogation frequencies. In this context, frequency dispersion refers a situation where certain materials in a medium respond differently to different interrogation frequencies. In certain earth formations, frequency dispersion has been observed to cause a higher resistivity to be measured with lower interrogation frequencies.

There is therefore a need for a technique that adjusts for the effects of frequency dispersion on electromagnetic wave well logging data. Advantageously, this technique would compensate for the effects of frequency dispersion, allowing more effective correlation of data obtained by tools employing different interrogation frequencies. Preferably, the technique could also be applied directly to existing logging data without requiring extensive knowledge of formation properties.

SUMMARY OF THE INVENTION

In accordance with one aspect of the invention, a method is provided for adjusting for the effects of frequency dispersion in the determination of an electrical property of a medium. The method includes deriving a specific model of an electrical property as a function of frequency, where the model includes admittance parameters. The model can be derived based on provided conductivity and associated dielectric constant values obtained by employing each of a plurality of interrogation frequencies. In addition, a method is provided for calculating an adjusted electrical property for a selected frequency of interest based on the specific model.

In accordance with a second aspect of the invention, a method is provided for estimating the effects of frequency dispersion in measurements of least one electrical property of an earth formation. The method includes providing a general model that includes a plurality of admittance parameters. Optionally each admittance parameter represents the admittance of a plurality of parallel combinations electrically coupled in series, where each parallel combination corresponds to a resistor and a capacitor electrically coupled in parallel. The method further includes providing a selected subset of a plurality of conductivity and associated dielectric constant measurements of a single volume of an earth formation that were obtained using a plurality of interrogation frequencies. The method further includes deriving a specific model for predicting, as a function of frequency, the at least one electrical property of the single volume by determining the plurality of complex admittance parameters that conform to a selected subset. Optionally, the selected subset may include, for each of the plurality of interrogation frequencies, a conductivity and an associated dielectric constant measurement of a single volume of an earth formation.

According to another aspect of the invention, a method is provided for adjusting well logging data to compensate for frequency dispersion effects. For each of a plurality of interrogation frequencies, raw well logging data are obtained, the raw well logging data being indicative of electrical characteristics of a portion of an earth formation, such as, for example, conductivity and dielectric constant. The method further provides a general model representing at least one electrical property of the earth formation as a function of frequency. The general model includes a plurality of admittance parameters. By assigning a value to each of the admittance parameters, wherein the values are selected to conform to the raw data, the general model may be converted to a specific model representing the at least one electrical property for the portion of the earth formation. The method evaluates the specific model for a selected interrogation frequency of interest to obtain an adjusted measurement of the at least one electrical property of the portion of the earth formation corresponding to the selected interrogation frequency of interest.

Optionally, the method for adjusting well logging data may include providing a resistivity tool, positioning it at a select point within a well borehole, generating the raw well logging data by transmitting one or more electromagnetic fields with the plurality of interrogation frequencies, and obtaining a conductivity measurements and an associated dielectric constant measurement corresponding to each interrogation frequency employed. The admittance parameters are selected to conform to a select group of the conductivity and dielectric constant measurements. Optionally, a subset of the conductivity and dielectric constant measurements are selected to derive the admittance parameters. Another option is for at least one of the admittance parameters to be selected based on known characteristics about the portion of the formation and the other admittance parameters are selected to conform to the select group of the conductivity and dielectric constant measurements. Also, the one or more electromagnetic fields may be a single wave with a plurality of interrogation frequency components or it may be a plurality of time spaced waves, each having one of the plurality of interrogation frequencies.

In addition, the method for adjusting well logging data may include repeating the step of positioning the resistivity tool for each of a plurality of select positions to obtain, for each position and for each interrogation frequency employed, a conductivity measurement and an associated dielectric constant measurement. The step of assigning a value to each of the admittance parameters may repeat for each selected position. Alternatively, the conductivity measurements and associated dielectric constant measurements, obtained for each of the positions, may be combined, such as by averaging, to provide a combined set of conductivity measurements and an associated dielectric constant measurements. The values of the admittance parameters may be based on the combined set.

It is therefore a technical advantage of the invention to enable actual measurements of conductivity and/or dielectric constant to be adjusted for the effects of frequency dispersion to reflect measurements expected to be obtained, under similar operating conditions, but obtained by employing a different interrogation frequency than actually used to obtain the measurements. A further technical advantage of the invention is that the techniques can be applied directly to existing logging data without requiring extensive knowledge of formation properties such as formation fluid content, pore microstructure, clay content, grain size, porosity, or tortuosity, all of which may be problematic to obtain with accuracy.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other methods and apparatus for carrying out the same purposes of the present invention. It should be also be realized by those skilled in the art that such equivalent methods and apparatus do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
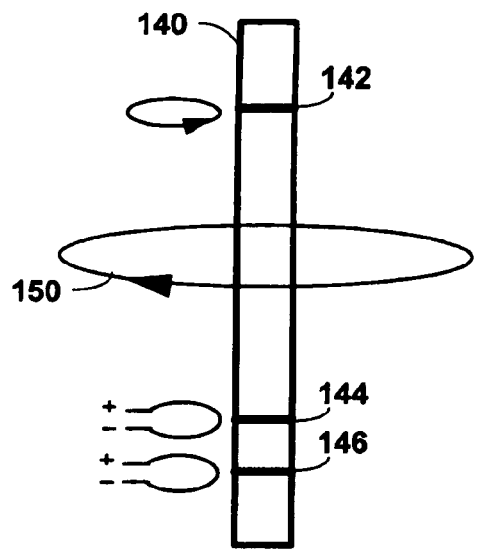
FIG. 1 illustrates a representation of a wave resistivity tool that provides suitable raw data that may be adjusted using the methods of the present invention.

FIG. 1 depicts an exemplary wave resistivity tool 140 that may be deployed in a borehole to obtain measurements of electrical properties of an earth formation. Wave resistivity tool 140 includes at least one transmitter 142 for selectively generating an electromagnetic wave with one or more interrogation frequencies into the surrounding earth formation. Two spaced-apart receivers 144, 146, included in the tool 140 detect the wave and measure raw data, such as the attenuation and or phase shift of the electromagnetic wave. The raw data are indicative of electrical properties of the surrounding earth formation, and thus may be used to estimate such electrical properties of the earth formation (e.g. conductivity or dielectric constant). The raw data may be subject to the effects of frequency dispersion, with the result that the measured values of the certain electrical properties may vary depending on the particular interrogation frequency employed by wave resistivity tool 140.

Figure 2:
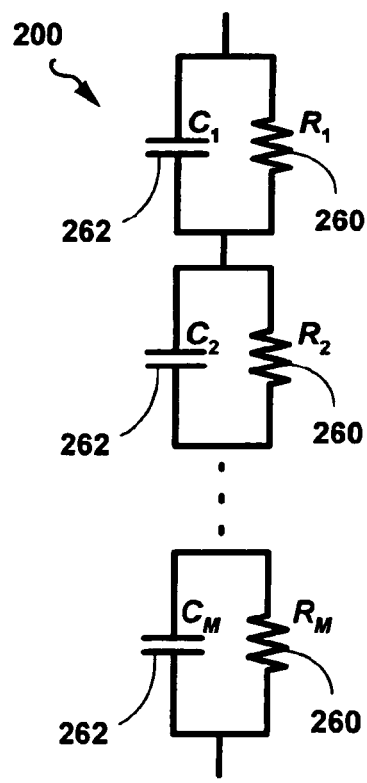
FIG. 2 illustrates an exemplary embodiment of the present invention for predicting the effects of frequency dispersion on measurements of conductivity and dielectric constant.

FIG. 2 illustrates an exemplary general model 200 suitable for approximating the frequency dispersion effects of a medium in which raw data are available. The raw data are indicative of certain electrical properties of an earth formation and were obtained by a tool, such as wave resistivity tool 140 on FIG. 1 that obtained the raw data by employing a plurality of different interrogation frequencies. General model 200 recognizes that, over the frequency range of interest, in certain earth formations of interest to oil and gas exploration, interfacial relaxation is a mechanism giving rise to frequency dispersion. Interfacial relaxation is a response to a normally incident electrical field due to the transition of properties between boundaries of lossy dielectric materials. Rock composed of small composite structures of materials having dissimilar dielectric and conductive characteristics can exhibit frequency dispersion due to interfacial relaxation. Water, oil, or gas embedded in porous rock may also exhibit the frequency dispersion effects of interfacial relaxation. Likewise, a network of drilling-fluid-filled narrow cracks radiating from a borehole is also known to exhibit frequency dispersion effects due to interfacial relaxation.

General model 200 approximates the frequency response of one or more electrical properties of a medium with a plurality of complex admittance parameters. The complex admittance parameters represent a combination of M complex admittances. In the exemplary embodiment, the complex admittances are electrically coupled in series and each complex admittance corresponds to a parallel combination of a resistor $R_m$ 260 and a capacitor $C_m$ 262, where m=1 to M. A current density 150 shown on FIG. 1 induced by the transmitted electromagnetic energy is approximated on FIG. 2 as a function of the complex admittance of the circuit, which in turn is a function of the individual complex admittances represented by the parallel combinations of $C_m$ 262 and $R_m$ 264, as follows:

$$J = \hat{\sigma}(\omega)E \qquad (1)$$

$$\hat{\sigma}(\omega) = \left[\sum_{m=1}^{M}(\sigma_m - i\omega\varepsilon_m)^{-1}\right]^{-1} \qquad (2)$$

$$C_m \propto \varepsilon_m \qquad (3)$$

$$R_m \propto \frac{1}{\sigma_m} \qquad (4)$$

The values for $\sigma_m$ and $\epsilon_m$, which are proportional to the complex admittance parameters $C_m$ 262 and $R_m$ 264 of general model 200, are derived to create a specific model 200' (not illustrated) that approximates the frequency response of the particular volume of interest. The values for $\sigma_m$ and $\epsilon_m$ are calculated based on the measured raw data indicative of certain electrical properties of the earth formation that were obtained by employing a plurality of interrogation frequencies.

For example, in the exemplary embodiment, the raw data are indicative of conductivity σ' and an associated dielectric constant ε' that were measured by employing a plurality of interrogation frequencies. In particular, in the exemplary embodiment, the raw data provides N sets of data, where each set, of the N sets of data, includes a conductivity σ'($\omega_n$) value and an associated dielectric constant ε'($\omega_n$) value obtained by employing a corresponding interrogation frequency $f_n$, where $\omega_n=2\pi f_n$, and where each set of the N sets of data corresponds to one of N distinct frequencies, $f_1, \ldots f_n$, where n=1 to N. One skilled in the art will recognize that alternatively, the raw data may be magnitude, attenuation, phase, phase shift, or other real or complex measurements of the electromagnetic signal detected by the receiver pair 144, 146 on FIG. 1 for the particular interrogation frequency that yields measurements of the electrical properties of the earth formation.

In the exemplary embodiment, each measurement of conductivity σ'($\omega_n$) and the associated dielectric constant ε'($\omega_n$) are for a single volume. Likewise, the raw data may be sensitive to conductivity σ'($\omega_n$) and the associated dielectric constant ε'($\omega_n$) in a given volume. Exemplary techniques for determining the appropriate values in any given volume of a formation are disclosed in U.S. Pat. No. 6,366,858. The present method is nonetheless not limited to the particular manner in which the raw data, conductivity and dielectric constants are obtained.

To derive each $\epsilon_m$ and $\sigma_m$, for m=1 to M, the measured (or simulated) conductivity σ'($\omega_n$) and associated dielectric constant ε'($\omega_n$) values are assumed to conform to equations (5) and (6) for each interrogation frequency $f_n$. Accordingly, the values $\sigma_m$ and $\epsilon_m$ for m=1, . . . , M may be calculated using the following equations based on the given N sets of data Advantageous use of the restriction M≦N allows the resultant equations to be solvable, for example, by using a nonlinear least squares method. The equations for deriving $\epsilon_m$ and $\sigma_m$ are:

$$\sigma'(\omega_n) = \text{Re}(\hat{\sigma}(\omega_n)) \qquad (5)$$

$$\varepsilon'(\omega_n) = \frac{-\text{Im}(\hat{\sigma}(\omega_n))}{\omega_n} \qquad (6)$$

where Re($\hat{\sigma}(\omega_n)$) denotes the real part of total complex conductivity $\hat{\sigma}(\omega_n)$ of specific model 200' and Im($\hat{\sigma}(\omega_n)$) denotes the imaginary part of total complex conductivity $\hat{\sigma}(\omega_n)$ of specific model 200'.

One of ordinary skill will recognize that the raw data may actually indicate different electrical properties for the various corresponding frequencies. For example, in the exemplary embodiment, where the N sets of data are provided, it is not necessary to have a conductivity σ'($\omega_n$) and associated dielectric constant ε'($\omega_n$) value for each of the N interrogation frequencies. Rather a subset may be sufficient to derive a suitable specific model, if the subset provides sufficient information to solve equations (5) and (6) to determine the admittance parameters $\sigma_m$ and $\epsilon_m$.

In some situations, one of the values $\sigma_m$ and $\epsilon_m$ is known from knowledge of the physical composition or features within the volume of interest. For example, one or more narrow cracks extending radially from the borehole may be invaded with highly insulative borehole fluid, allowing one of the $\sigma_m$ to be estimated in that case. However, $\epsilon_m$ will likely remain unknown without actual knowledge of the geometry of the crack(s). In this situation, $\sigma_m$ may optionally be fixed and the associated $\epsilon_m$ derived by solving the above equations.

After the M complex admittance values $\sigma_m$ and $\epsilon_m$ are calculated, general model 200 then becomes specific model 200' for the particular volume of interest. Specific model 200' takes into account the effects of frequency dispersion that are characteristic of the particular of volume of interest to predict an adjusted conductivity σ"($\overline{\omega}$) and/or an associated adjusted dielectric constant ε"($\overline{\omega}$) that are expected to be measured by a tool, operating under similar conditions in which the raw data or given N sets of data were obtained, but employing a selected interrogation frequency of interest $\overline{f}$, where $\overline{\omega}=2\pi\overline{f}$. The frequency of interest may include frequencies for which no measured data are available. The following equations provide the relationships for calculating an adjusted conductivity σ"($\overline{\omega}$) and an adjusted dielectric constant ε"($\overline{\omega}$) for the selected interrogation frequency of interest $\overline{f}$:

$$\hat{\sigma}(\overline{\omega}) = \left[\sum_{m=1}^{M}(\sigma_m - i\overline{\omega}\varepsilon_m)^{-1}\right]^{-1} \qquad (7)$$

$$\sigma''(\overline{\omega}) = \text{Re}(\hat{\sigma}(\overline{\omega})) \qquad (8)$$

$$\varepsilon''(\overline{\omega}) = \frac{-\text{Im}(\hat{\sigma}(\overline{\omega}))}{\overline{\omega}} \qquad (9)$$

where Re($\hat{\sigma}(\overline{\omega})$) denotes the real part of total complex conductivity $\hat{\sigma}(\overline{\omega})$ of specif model 200' and Im($\hat{\sigma}(\overline{\omega})$) denotes the imaginary part of total complex conductivity $\hat{\sigma}(\overline{\omega})$ of specific model 200'.

Figure 3:
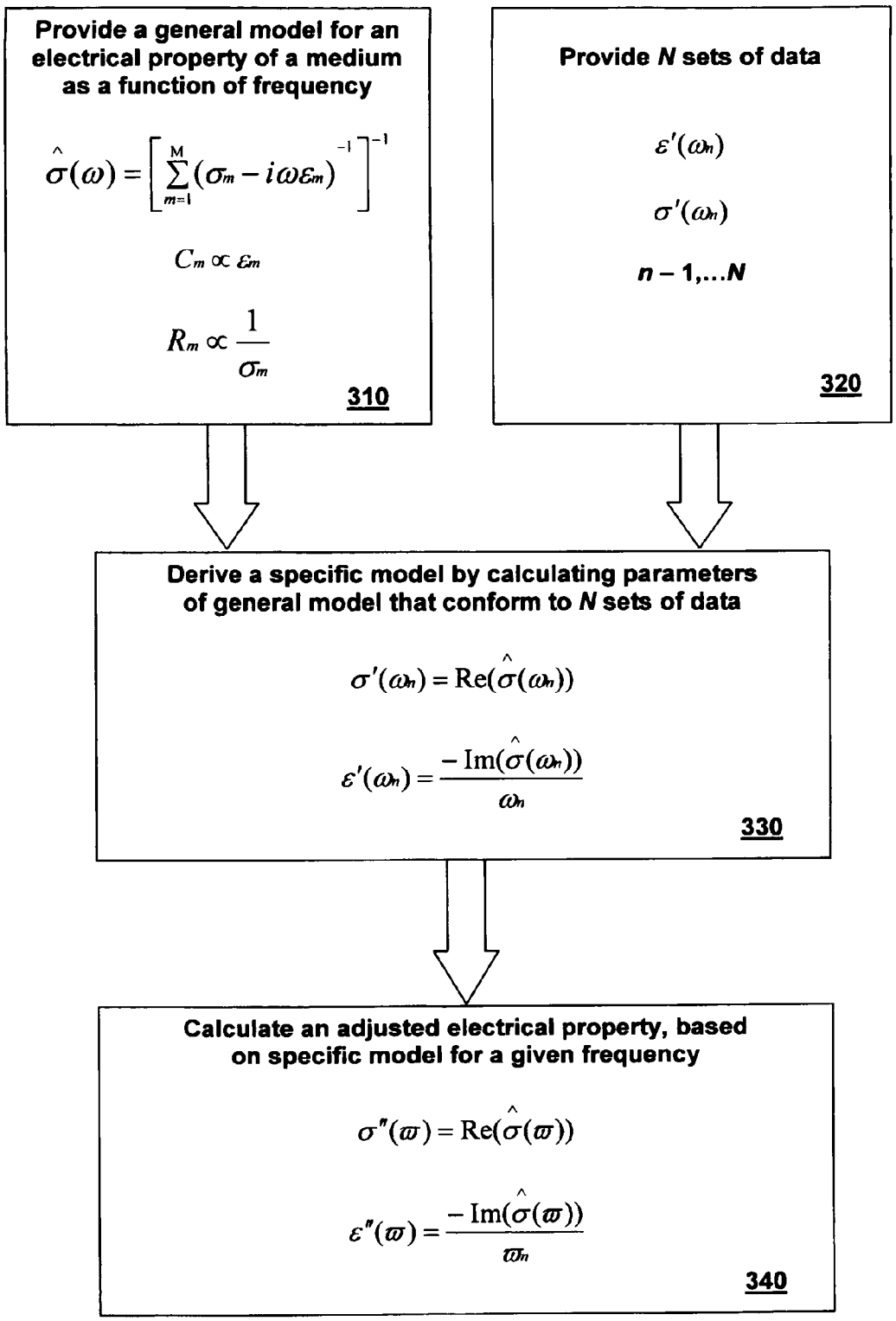
FIG. 3 depicts an exemplary method for adjusting measurements of conductivity and/or dielectric constant for the effects of frequency dispersion in accordance with the present invention.

FIG. 3 illustrates an exemplary method embodiment 300 of the present invention for utilizing a model to derive the conductivity and dielectric constant of a medium in a manner that is sensitive to the effects of frequency dispersion.

Step 310 of method 300 provides a general model that approximates the frequency response of a medium. An example of a suitable general model in step 310 would be a closed circuit combination of two or more lossy dielectric elements in which an alternating current is induced. Model 200 as shown on FIG. 2 would be suitable, for example.

Advantageously, the number M of complex admittances represented by specific model 200' is selected to be at least equal or less than N, the number of sets of data available, i.e. M≦N. For some media comprising increasing variations of composite structures, the accuracy of specific model 200' can be enhanced as N and/or M are increased, and also as N sets of data encompass a broader range interrogation frequencies.

Optionally, in a situation where N sets of data are available for two or more interrogation frequencies, M may be selected to be one, and specific models are determined for each set of data corresponding to a given frequency. If these specific models are essentially the same for each of the interrogation frequencies, then this indicates that frequency dispersion is not a factor affecting the measurements over the range of frequencies associated with the measurements. On the other hand, if said specific models are different, then a specific model with M selected to be greater than 1 may represent the dispersion effects more accurately.

Steps 310 and 320 may occur in any order. Step 320 of method 300 provides N sets of data for the particular volume of interest, where a conductivity $\sigma'(\omega_n)$ value and an associated dielectric constant $\epsilon'(\omega_n)$ value for the particular volume of interest were measured (or simulated) employing each corresponding one of N interrogation frequencies $f_n$, where also $\omega_n = 2\pi f_n$ and n=1, . . . , N and N≧2.

Step 330 of method 300 creates a specific model for the particular volume of interest, based on the general model provided in step 310 and the N sets of data provided in step 320. The specific model provides an adjusted conductivity and/or an adjusted dielectric constant of the volume of interest as a function of frequency. For example, where general model 200 on FIG. 2 is used as the general model called out in step 310 of FIG. 3, step 330 creates a specific model 200' (not illustrated) by deriving the complex admittance parameters of general model 200 that conform to the N sets of data provided in step 320.

Still referring to FIG. 3, step 340 requires an adjusted conductivity $\sigma''(\bar{\omega})$ and/or an adjusted dielectric constant $\epsilon''(\bar{\omega})$ to be derived, based on the specific model determined in step 330, for a selected specified interrogation frequency $\bar{f}$. Adjusted conductivity $\sigma''(\bar{\omega})$ and adjusted dielectric constant $\epsilon''(\bar{\omega})$ represent the values expected to be measured by a tool for the particular volume of interest, operating under similar operating conditions as the given N sets of data were obtained, but employing the selected interrogation frequency of interest $\bar{f}$.

Method 300 on FIG. 3 may be applied for each volume of interest within a formation in which the N sets of data are available. For example, method 300 may be used to adjust logging data comprising a plurality of measurements obtained by a wave resistivity tool positioned at P number of different points (e.g. depths) along a borehole. In this exemplary application, steps 320–340 may be repeated for each point.

Alternatively, each of the given N sets of data provided in step 320 may be derived by combining a plurality of conductivity values $\sigma_p(\omega_n)$ and associated dielectric constant values $\epsilon_p(\omega_n)$, where p=1 to P, that were measured at P number of different points along a borehole. For example, the conductivity values $\sigma'(\omega_n)$, where n=1 to N, may each be an average of a corresponding plurality conductivity values $\sigma_p(\omega_n)$ (where p=1 to P) that were measured at P number of different points along a borehole by employing the corresponding interrogation frequency $f_n$. Likewise, the associated dielectric constant values $\epsilon'(\omega_n)$, where n=1 to N, may each be an average of a plurality dielectric constant values $\epsilon_p(\omega_n)$, where p=1 to P, that were obtained by employing the corresponding interrogation frequency $f_n$.

Method 300 on FIG. 3 is not limited in its application or use in adjusting well logging data for the effects of frequency dispersion. For example, one application of method 300 is to enhance the correlation of logging data obtained by a wave resistivity tool and by an inductive or galvanic resistivity tool within the same borehole. In this example, method 300 may be used to adjust for frequency dispersion by adjusting the logging data obtained using the wave resistivity tool at one interrogation frequency, so as to correspond with logging data at different interrogation frequency employed by the inductive or galvanic resistivity tool. A comparison that utilizes the logging data adjusted for frequency dispersion may yield additional useful information.

In this example, the wave resistivity tool may employ a first and a second interrogation frequency ($f_1$, $f_2$) to obtain two sets of data (N=2) for each point (or depth) along the borehole. The first and second interrogation frequencies ($f_1$, $f_2$) may be selected from the range of 400 kHz to 2 MHz, which are commonly employed for wave resistivity tools. The interrogation frequency of interest $\bar{f}$ may be selected in step 340 in method 300 from the range of 100 Hz to 100 kHz to correspond to an interrogation frequency commonly employed by a inductive or galvanic resistivity tool.

Similarly, method 300 is suitable to adjust or normalize conductivity and/or dielectric constant measurements that were obtained by various techniques employing a range of interrogation frequencies to reflect the results expected for a single selected interrogation frequency of interest $\bar{f}$, such as 20 MHz, for increased consistency in the interpretation of the various measurements.

In addition, conductivity and dielectric constant measurements obtained by a wave resistivity tool may be adjusted, using method 300, to approximate conductivity at DC, i.e.

$$\sigma''_{DC} = \lim_{\omega \to 0} \sigma''(\omega).$$

In the derivation of $\sigma_{DC}''$, the specific model created in step 330 tends to be insensitive to M Thus, in this example, accurate approximations of $\sigma_{DC}''$ can be derived from standard dual frequency propagation resistivity tools, such as tools employing interrogation frequencies of 500 kHz and 2 MHz.

Method 300 is not limited to any particular interrogation frequencies $f_1, \ldots, f_N$, and selected interrogation frequency of interest $\bar{f}$. Rather, it may be applied to derive an estimate of conductivity $\sigma''(\bar{\omega})$ and/or dielectric constant $\epsilon''(\bar{\omega})$ for any selected interrogation frequency of interest $\bar{f}$ based on provided N sets of data ($\sigma'(\omega_n)$, $\epsilon'(\omega_n)$ n=1, . . . ,N) that were measured using any available methods employing any two or more selected interrogation frequencies $f_1, \ldots, f_N$. In addition, method 300 may be applied to N sets of data ($\sigma'(\omega_n), \epsilon'(\omega_n)$ n=1, ... ,N) that are synthesized, for example, by a simulator, rather than actually measured.

Figure 4:
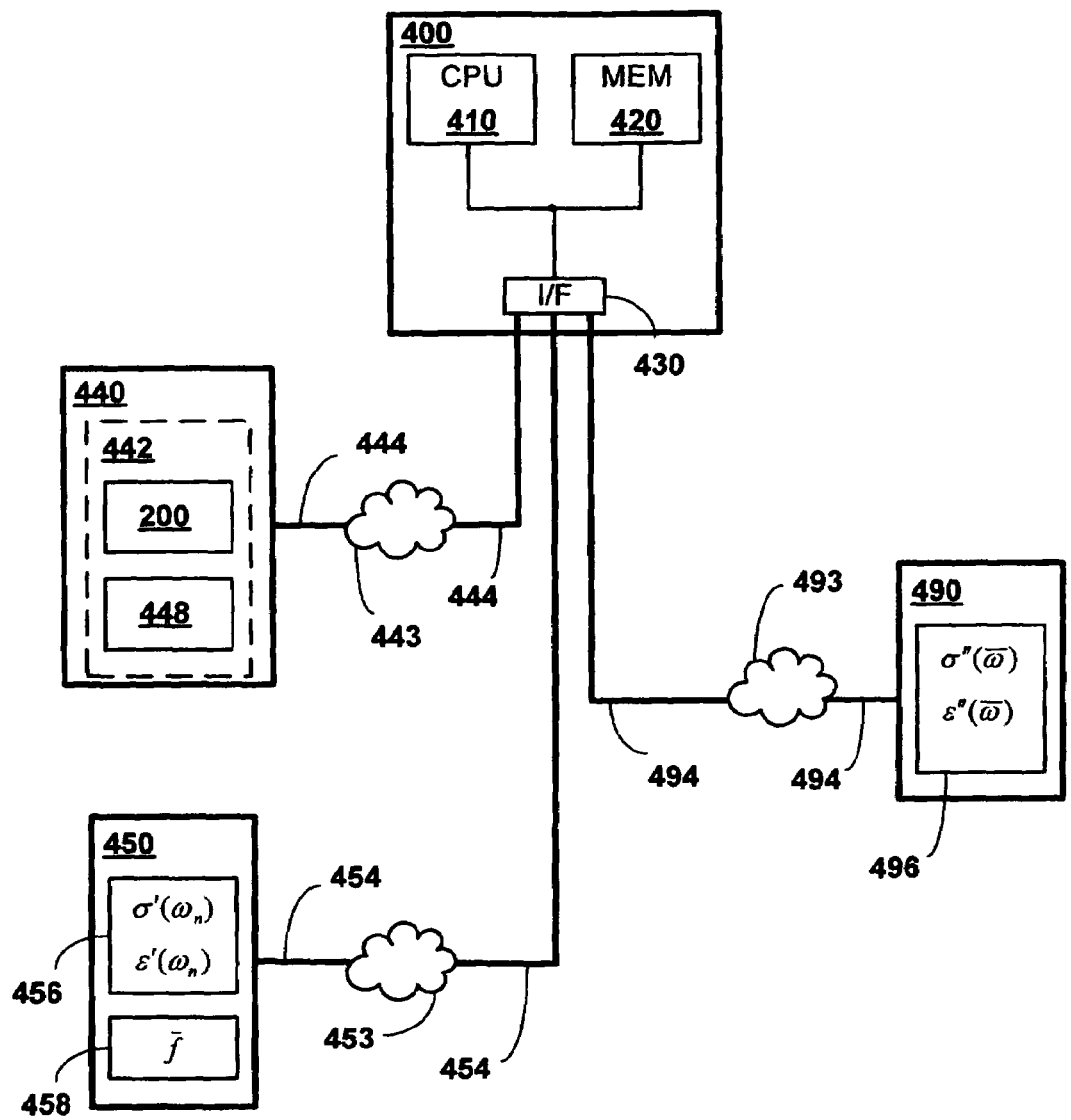
FIG. 4 depicts an exemplary system upon which the methods of the present invention may be implemented.

FIG. 4 depicts an exemplary system 400 upon which the methods of the present invention can be implemented. System 400 comprises a processor 410, local memory 420, and an interface 430. System 400 is adapted to retrieve via the interface 430 and path 444 a processor executable program 442 from processor readable medium 440. Path 444 may optionally include a remote communications device 443.

System 400 is also in communication with a second processor readable medium 450, via interface 430 and path 454 (which may also include a remote communications device 453). Processor readable medium 450 includes at least one interrogation frequency of interest $\bar{f}$ 458 and data 456 for a particular volume of interest. Data 456 may include either the conductivity value $\sigma$ and an associated dielectric constant value $\epsilon$ for the volume of interest, or N sets of such data.

The processor executable program 442 comprises a general model 200 and processor executable code 448. Code 448 is selectively retrievable and selectively executable to direct the processor 410 to: (1) retrieve a general model 200, (2) retrieve data 456 and the at least one interrogation frequency of interest $\bar{f}$ 458; (3) derive a specific model (not illustrated) for a particular volume of interest based on the corresponding general model 200 and data 456; and (4) calculate an adjusted electrical property 496, such as conductivity $\sigma''(\bar{\omega})$ or dielectric constant $\epsilon''(\bar{\omega})$ based on the specific model.

Processor executable code 448 is also adapted to selectively direct the processor 410 to store, via interface 430 and path 494, (which may also include a remote communications device 493), the adjusted electrical property 496 on third processor readable medium 490.

It will be appreciated that the network topology and architecture illustrated in FIG. 4 are exemplary only. The methods of the present invention are not limited to any particular data processing network topology or architecture. For example, processor readable media 440, 450, 490 may each be different types and different physical units, or they may de different portions of the same unit. Suitable processor readable media 440, 450, 490 include, for example, an integrated semiconductor memory device or array of memory devices, a floppy diskette, a CD, a magnetic tape, an integrally located hard drive and/or a remote hard drive.

Interface 430 may comprise a plurality of integrated or distributed devices, such as a local data transfer bus or communications adapter, where each is adapted to transfer data between the processor 410 or local memory 420 and one of the processor readable media 440, 450, 490. Remote communications devices 443, 453, 493 may each be different types or different physical devices. Remote communications devices 443, 453, 493 may be the same type or same physical device, such as a packet switch network, a telephone line, the Internet, mud telemetry communications mechanism or other any other mechanism capable of transferring data. The interrogation frequency $\bar{f}$ of interest 458 may be received with the data 456; alternatively, it may be embedded in the processor executable program 442, or it may be received separately from the program 442. The data 456 and interrogation frequency $\bar{f}$ of interest 458 may be received, for example, directly from a user via a computer keyboard.

One skilled in this art will recognize that the processor executable program 442, data 456, and interrogation frequency $\bar{f}$ of interest 458 may be received piecemeal or in a combined fashion. Furthermore, the person of skill in the art will appreciate that the functions of the computer system illustrated on FIG. 4 may be distributed over more then one device or physical system, or alternatively may be embedded within a wave resistivity tool.

The person of skill in the art will further recognize that processor executable program 442 (including code 448) may include instructions and logic operable on general model 200, data 456 and interrogation frequency of interest 458. Such instructions and logic may be embodied in software executable on a general purpose processor, or may alternatively be hard-coded into hardware, or may alternatively be programmed into firmware.

Although the present invention and its advantages have been described in detail, it should be understood that various changes, substitutions and alternations can be made herein without departing from the spirit and scope of the invention as defined by the appended claims.

I claim:

1. A method for adjusting well logging data for effects of frequency dispersion, the method comprising:
    (a) providing a general model that includes a plurality of admittance parameters;
    (b) providing a tool suitable to measure conductivity and dielectric constant of a downhole formation by employing a first and a second interrogation frequency;
    (c) positioning the tool at a selected location within a borehole;
    (d) disposing the tool to measure, a portion of earth formation surrounding the selected location to obtain first and a second sets of data, the first set of data indicative of a first conductivity measurement and a first dielectric constant measurement corresponding to the first interrogation frequency, the second set of data indicative of a second conductivity measurement and a second dielectric constant measurement corresponding to the second interrogation frequency; and
    (e) assigning values to each of the plurality of admittance parameters to form a specific model for predicting measurements of at least one electrical property of the portion as a function of interrogation frequency, wherein the specific model is consistent with the first and second sets of data and corresponding first and second interrogation frequencies.

2. The method of claim 1, wherein the at least one electrical property is conductivity, and further comprising:
    (f) calculating an adjusted conductivity measurement by applying a third interrogation frequency to the specific model, wherein the third interrogation frequency is distinct from the first and second of interrogation frequencies.

3. The method of claim 2, further comprising:
    (g) employing the third interrogation frequency to provide a separately measured conductivity measurement of substantially the portion of earth formation measured in (d), and
    (h) comparing the adjusted conductivity measurement in (f) to the separately measured conductivity measurement in (g).

4. The method of claim 3, wherein the tool in (b) is a wave resistivity tool, and the separately measured conductivity measurement in (g) was obtained by a inductive resistivity tool.

5. The method of claim 1, wherein the at least one electrical property is dielectric constant, and further comprising:

(f) calculating an adjusted dielectric constant measurement by applying a third interrogation frequency to the specific model, wherein the third interrogation frequency is distinct from the first and second of interrogation frequencies.

6. The method of claim 1, further comprising:

(f) repeating (c) and (d) for a plurality of selected locations within the borehole to obtain a plurality of first and second sets of data, each of the selected locations associated with one of the first sets of data and one of the second sets of data; and (g) repeating step (e) for each of the plurality of selected locations to derive a plurality of corresponding associated specific models.

7. The method of claim 1, further comprising:

(f) repeating (c) and (d) for a plurality of different selected locations to obtain a plurality of first and second sets of data; and (g) calculating a combined first set of data based on each of the plurality of first sets of data and a combined second set of data based on each of the plurality of second sets of data; and (h) repeating (e) to derive a specific model that is consistent with the combined first and second sets of data and corresponding first and second interrogation frequencies.

8. The method of claim 7, wherein the combined first set of data is the average of a each of the plurality of first sets of data and the combined second set of data is the average of each of the plurality of second sets of data.

9. The method of claim 1, wherein the first and second sets of data each include complex values representing measurements of a component of an electromagnetic field induced in the portion by a corresponding interrogation frequency.

10. The method of claim 1, wherein the tool in (b) comprises a transmitter suitable to generate an electromagnetic wave having the first interrogation frequency and the second interrogation frequency, and wherein the tool further comprises two spaced receivers suitable for detecting the electromagnetic wave, and wherein (d) further comprises:

(f) generating the electromagnetic wave by the transmitter; and (g) detecting the electromagnetic wave by the two spaced receivers.

11. The method of claim 10, wherein the first set of data includes data reflecting attenuation of the first interrogation frequency and the second set of data includes data reflecting attenuation of the second interrogation frequency.

12. The method of claim 10, wherein the first set of data includes data reflecting phase-shift of the first interrogation frequency and the second set of data includes data reflecting phase-shift of the second interrogation frequency.

* * * * *